United States Patent [19]
Aono

[11] Patent Number: 6,131,146
[45] Date of Patent: Oct. 10, 2000

[54] INTERLEAVE MEMORY CONTROL APPARATUS AND METHOD

[75] Inventor: Fumio Aono, Tokyo, Japan

[73] Assignee: NEC Corporation, Tokyo, Japan

[21] Appl. No.: 09/056,647

[22] Filed: Apr. 8, 1998

[30] Foreign Application Priority Data

Apr. 25, 1997 [JP] Japan .................................... 9-109826

[51] Int. Cl.[7] ................................................. G06F 12/00
[52] U.S. Cl. .............................. 711/157; 711/5; 711/157; 711/170; 711/173; 362/230.04
[58] Field of Search .................... 711/2, 5, 127, 711/153, 157, 170, 172, 173; 365/230.04

[56] References Cited

U.S. PATENT DOCUMENTS

| | | | |
|---|---|---|---|
| 5,522,059 | 5/1996 | Marushima et al. ....................... | 711/5 |
| 5,530,837 | 6/1996 | Williams et al. ....................... | 711/157 |
| 5,668,974 | 9/1997 | Grassi et al. ............................. | 711/157 |
| 5,924,111 | 7/1999 | Huang et al. ............................ | 711/157 |

OTHER PUBLICATIONS

Cheung et al. Design and analysis of a gracefully degrading interleaved memory system, IEEE Transactions on Computers, vol. 39(1) (Jan. 1990): 63–71.

*Primary Examiner*—Eddie P. Chan
*Assistant Examiner*—Yamir Encarnacion
*Attorney, Agent, or Firm*—Foley & Lardner

[57] ABSTRACT

A high multiplexing degree or interleaving factor is achieved in a memory having banks of different capacities. A group judging circuit generates the relevant interleave group and addresses in such group on the basis of the start address and sub-bank number of each interleave. A bank selection circuit generates a sub-bank number and addresses in the sub-bank on the basis of the address in the group. A multiplier and adder generate addresses in the bank on the basis of the addresses in the sub-bank.

4 Claims, 8 Drawing Sheets

FIG.5

INTERLEAVE MEMORY CONTROL APPARATUS AND METHOD

BACKGROUND OF THE INVENTION

The present invention relates to an interleave memory control apparatus and method. In particular, the present invention relates to a memory control apparatus and method for controlling an interleave of a memory.

A dynamic random access memory (DRAM) is often used for a memory device in an information processing system. A DRAM generally requires, after it is accessed, a waiting time of several tens of nano-seconds (ns) until the next access can be made. Based on this, there has been introduced, in high performance systems, an interleave system to minimize the DRAM waiting time. In the interleave system, an address is exclusively given to an aggregation of a plurality of DRAMs (hereinafter, called a bank) that may be accessed in parallel. In this case, if the object bank is different, a new access may be made in parallel to another bank without waiting for the end of access of the object bank during execution. The bank addresses are often given so that different banks are sequentially used when the addresses to the memory are continuous, which utilizes the characteristic that continuous access to the memory is executed in an ascending or descending sequence.

On the other hand, since memory capacity required for an information processing system is different depending on users, needs or the processing object, the memory capacity may be varied in many information processing systems. Therefore, users are capable of selecting adequate memory capacity within the range between a minimum capacity and a maximum capacity of the information processing system, and expanding the memory capacity at a later time, depending on the memory requirements. In view of realizing such a requirement, a memory device may be composed of a loading unit called a memory module. When one memory module forms one bank, it may be considered that a plurality of banks are included in one memory module and one bank is formed of a plurality of memory modules. Moreover, in some cases, only a kind of memory module is provided, but it is also probable that a large capacity memory module may be provided because of a generation change of a DRAM.

If a memory module of different capacity is provided, it is important for protection of hardware resources of users to allow for the use of a new large capacity module in combination with an old small capacity module. In order to allow co-existence of memory modules having different capacities, it is required to introduce a method of supplying addresses without any problem to various combinations of different memory modules. Moreover, another method can also be considered, in which the continuous addresses starting from the maximum address before expansion are given to the memory modules expanded. In this case, since the interleave in the added address regions is executed within the expanded memory modules, the expanded memory modules are required to have the sufficient number of banks. However, since the depth in the address direction increases for the bit width with increase of capacity of a DRAM, the memory capacity increases in the memory modules having a plurality of banks. Thereby, it is impractical to provide memory modules of a small expansion unit.

Therefore, in view of keeping small the expansion unit and acquiring a high multiplexing degree of interleaving (interleaving factor, or number of way), it is required to provide an interleave that is variable depending on the structure of memory device and memory module, and also provide an interleave that is variable for the expansion modules and those already provided.

As a method of realizing the interleave, it is considered to form an interleave by combining the banks of equal capacity as shown in FIG. 7. For example, it is assumed that the bank of No. %0 and No. %1 each has a capacity of 4 MB, the bank of No. %2 and %3 each has a capacity of 2 MB, and the bank of No. %4 to %7 each has a capacity of 1 MB. In this example, a two-way interleave is formed with 8 MB total capacity with bank No. %0 and %1, a two-way interleave is also formed with 4 MB total capacity with bank No. %2 and %3, and a four-way interleave is formed with 4 MB total capacity with bank No. %4 to %7.

As another method, for example, it is also considered that a plurality of banks having a small capacity are combined to form banks having a large capacity, as shown in FIG. 8. When the banks are assumed to have the capacity like that of FIG. 7, a four-way interleave can be formed with a total capacity of 16 MB.

In the above technique, for example, when the weighted mean of the multiplexing degree of interleaving (interleaving factor) is calculated in the example shown in FIG. 7, it can be obtained as $$(2\text{ WAY} \times 8\text{ MB} + 2\text{ WAY} \times 4\text{ MB} + 4\text{ WAY} \times 4\text{ MB})/16\text{ MB} = 2.5$$

and the 2.5-way interleave can be formed substantially. Meanwhile, in the example of FIG. 8, it can be understood that the four-way interleave is formed, and the multiplexing degree is obtained as $$(4\text{ WAY} \times 16\text{ MB})/16\text{ MB } 4.0$$

In these techniques, the multiplexing degree of interleave is limited, and thereby memory performance is deteriorated. Namely, the throughput of memory is lowered if an interleave that cannot substantially utilize the natural parallelism is structured in spite of having a bank provided in a physically different slot.

SUMMARY OF THE INVENTION

In order to overcome the problems explained above, a memory control apparatus of the present invention divides each of a plurality of memory banks into sub-banks and combines the sub-banks belonging to different memory banks to form an interleave, and is characterized in that an address in the bank of a plurality of memory banks is generated to form the interleave in an interleave group on the basis of the address of the memory control apparatus as a whole.

Moreover, the memory control apparatus of the present invention comprises an interleave deciding circuit to generate a logical bank number and address in the bank based on the address of the memory apparatus as a whole, and a bank number conversion table for converting a logical bank number generated by the interleave deciding circuit into a physical bank number.

Moreover, the memory control apparatus of the present invention comprises a group judging circuit for generating an address in the interleave group based on the address of the memory apparatus as a whole, a bank selecting circuit for generating a sub-bank number and address in the sub-bank based on the address in the interleave group generated by the group judging circuit, and a circuit for generating an address in the bank of a plurality of memory banks based on the address in the sub-bank generated by the bank selecting circuit.

Moreover, another memory control apparatus of the present invention is provided for a memory apparatus that divides each of a plurality of memory banks into sub-banks, and combines the sub-banks included in different memory banks to form an interleave, comprising an interleave deciding circuit for generating an address in the bank of a plurality of memory banks to form the interleave in the interleave group based on the address of the memory apparatus as a whole.

Moreover, the another memory control apparatus of the present invention further comprises, in the interleave deciding circuit, a bank number conversion table that generates the logical bank number based on the address of the memory apparatus as a whole to convert the logical bank number generated by the interleave deciding circuit into the physical bank number.

Moreover, the another memory control apparatus of the present invention further comprises a start address register for holding a start address of the interleave group and a sub-bank number register for holding the number of sub-banks belonging to the interleave group, the interleave group deciding circuit includes a group judging circuit, and the group judging circuit comprises a subtractor for subtracting the start address from the address of the memory apparatus as a whole and outputting the result of subtraction as the address in the interleave group, a multiplier for multiplying the sub-bank capacity to the number of sub-banks and a means for outputting, when an output of the subtractor is 0 or larger but is smaller than output-of the multiplier, that an output is within the range of interleave group and also outputting, when an output of the subtractor is not in the above case, that the output is not in the range of the interleave group.

Moreover, the another memory control apparatus of the present invention further comprises, in the interleave group deciding circuit, a bank selecting circuit for outputting the sub-bank number and address in the sub-bank based on the address in the interleave group.

Moreover, the another memory control apparatus of the present invention comprises, in the interleave group deciding circuit, a means for generating the address in the bank based on the address in the sub-bank.

Moreover, the another memory control apparatus of the present invention expresses capacity of the sub-bank as a common divisor of the capacities of different memory banks.

BRIEF DESCRIPTION OF THE DRAWINGS

The above-mentioned objects and advantages of the invention will become more apparent from the following detailed description when read in conjunction with the accompanying drawings, with like reference numerals indicating corresponding parts throughout, and wherein:

FIG. 5 is a diagram showing an example of interleave in the embodiment of the present invention.

DETAILED DESCRIPTION OF THE PREFERRED EMBODIMENTS

A preferred embodiment of the memory control apparatus of the present invention will be explained in detail with reference to the accompanying drawings.

Prior to explanation about a structure of the present invention, an interleave system that is a precondition of the structure will be explained.

Figure 5:
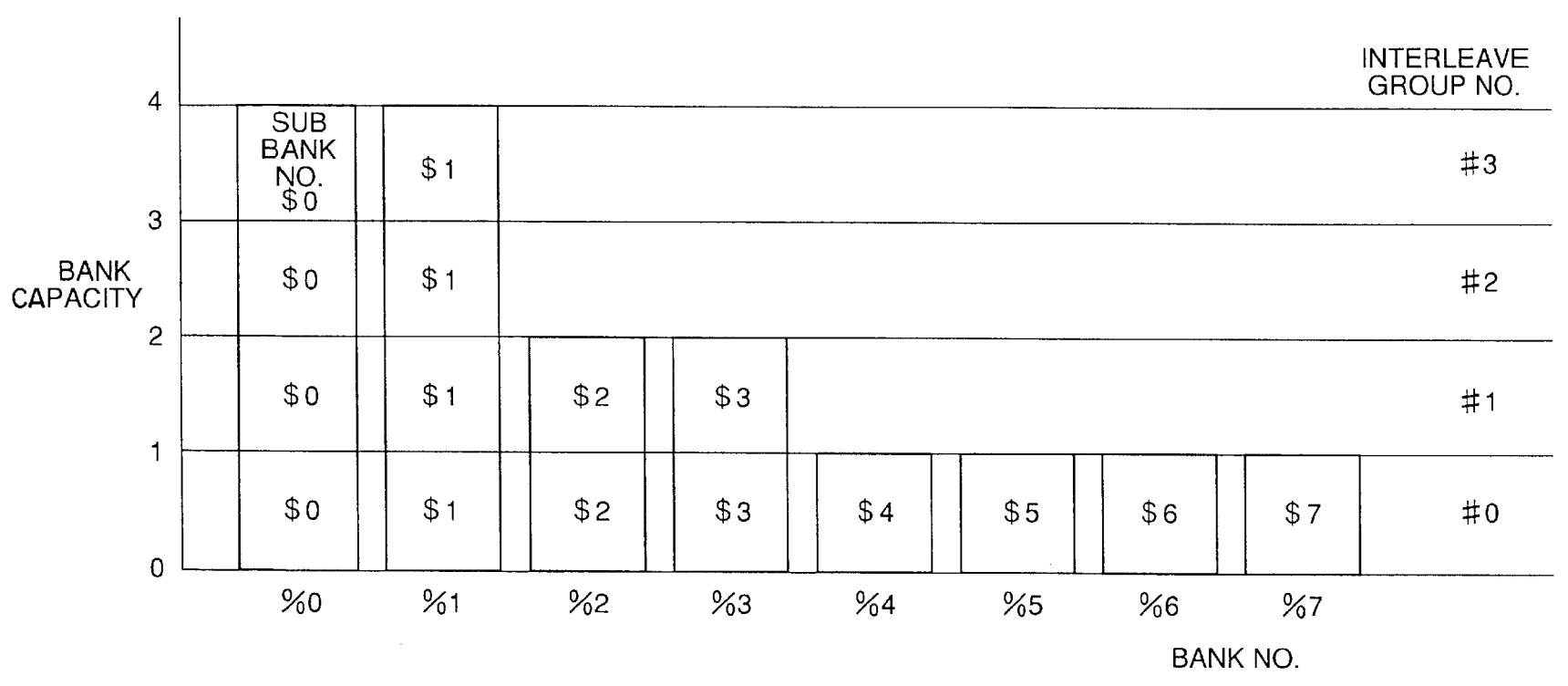

With reference to FIG. 5, the banks are indicated in the horizontal direction, while capacity of each bank is indicated in the vertical direction of a memory apparatus having eight banks. In order to simplify the explanation, the banks No. %0 and %1 are assumed to each have a capacity of 4 MB, while the banks No. %2 and %3 each have a capacity of 2 MB, and the banks No. %4 to %7 each have a capacity of 1 MB. In memories for typical applications, bank capacity is larger than such capacity given in this example, and capacities such as 64 MB, 128 MB, or more, for example, may be used as the unit size of a bank.

In FIG. 5, each region partitioned by the horizontal lines indicates an interleave group that is characteristic of the present invention. The interleave group #0 is formed having a capacity of 8 MB in total, and includes the leading 1 MB block of each bank. The interleave group #1 is formed having a capacity of 4 MB in total, and includes the second 1 MB block of the banks No. %0 to %3. The interleave group #2 is formed having a capacity of 2 MB in total, and includes the third 1 MB block of the banks No. %0 and %1. The interleave group #3 is formed having a capacity of 2 MB in total, and includes the last 1 MB block of the banks No. %0 and %1.

Figure 6:
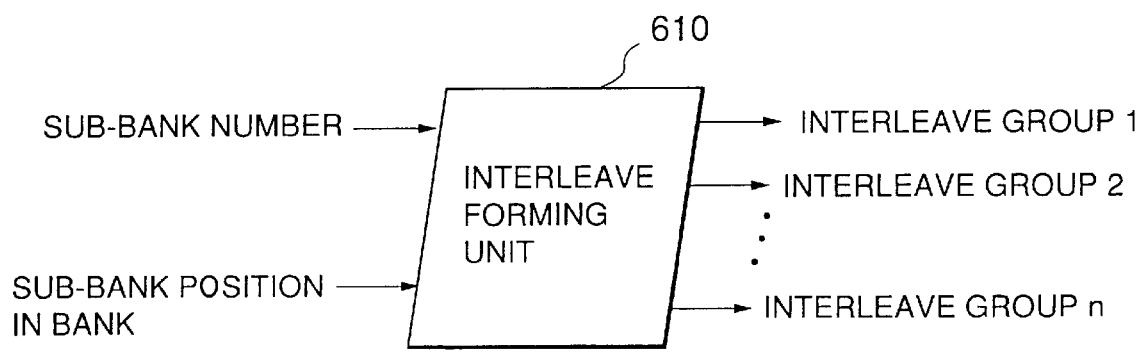
FIG. 6 is a diagram showing an interleaving forming unit in the embodiment of the present invention.

In FIG. 6, there is shown a functional block diagram of an interleaving group forming unit 610 that receives as input the Subbank number, such as $0, and the Subbank position in a Bank, and provides an interleave group number as an output.

Referring back to FIG. 5, the block of 1 MB obtained by dividing the banks of 4 MB and 2 MB is called a "sub-bank". Namely, the interleave group #0 has the sub-banks $0 to $7 that correspond to the first 1 MB block in each bank, and the interleave group #1 has the sub-banks $0 to $3 that correspond to the second 1 MB block in the first four banks. Here, the capacity of a sub-bank is assumed to be equal for simplification of explanation of the present invention, but the capacity may be different and the teachings of the present invention would still be applicable to such a system. As one example, the memory capacity of a sub-bank may be a common divisor of the memory capacity of a bank.

In this explanation, the interleave is executed in each interleave group. Therefore, in the example of FIG. 5, an eight-way interleave is executed in the interleave group #0, a four-way interleave in the interleave group #1, and a two-way interleave in the interleave groups #2 and #3, respectively.

The weighted mean of the multiplexing degree in the example of FIG. 5 to which the present invention is applied can be calculated as indicated below.

(8 WAY×8 MB+4 WAY×4 MB+2 WAY×4 MB)/16 MB=5.5

Figure 7:
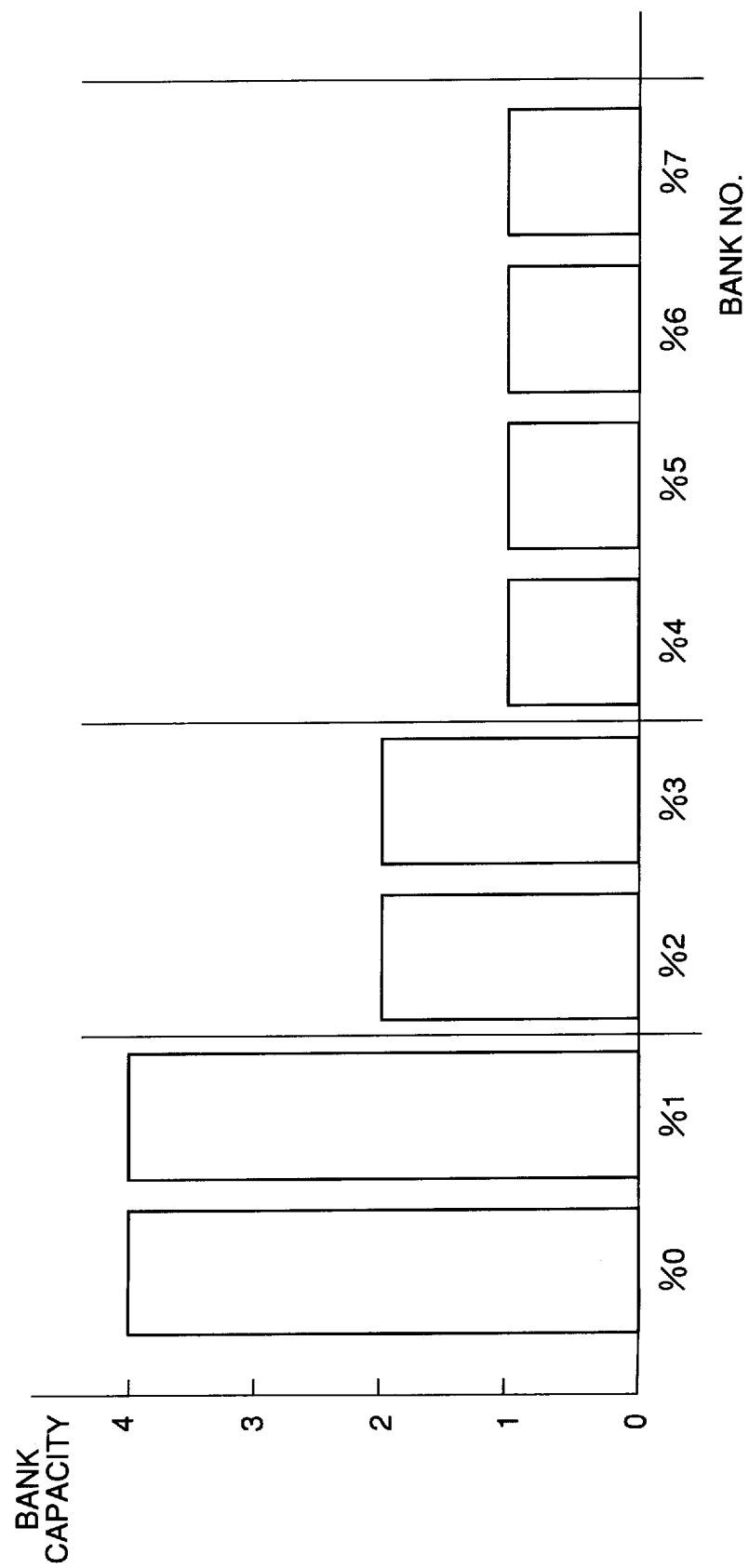
FIG. 7 is a diagram showing an example of the interleave of the related art.
Figure 8:
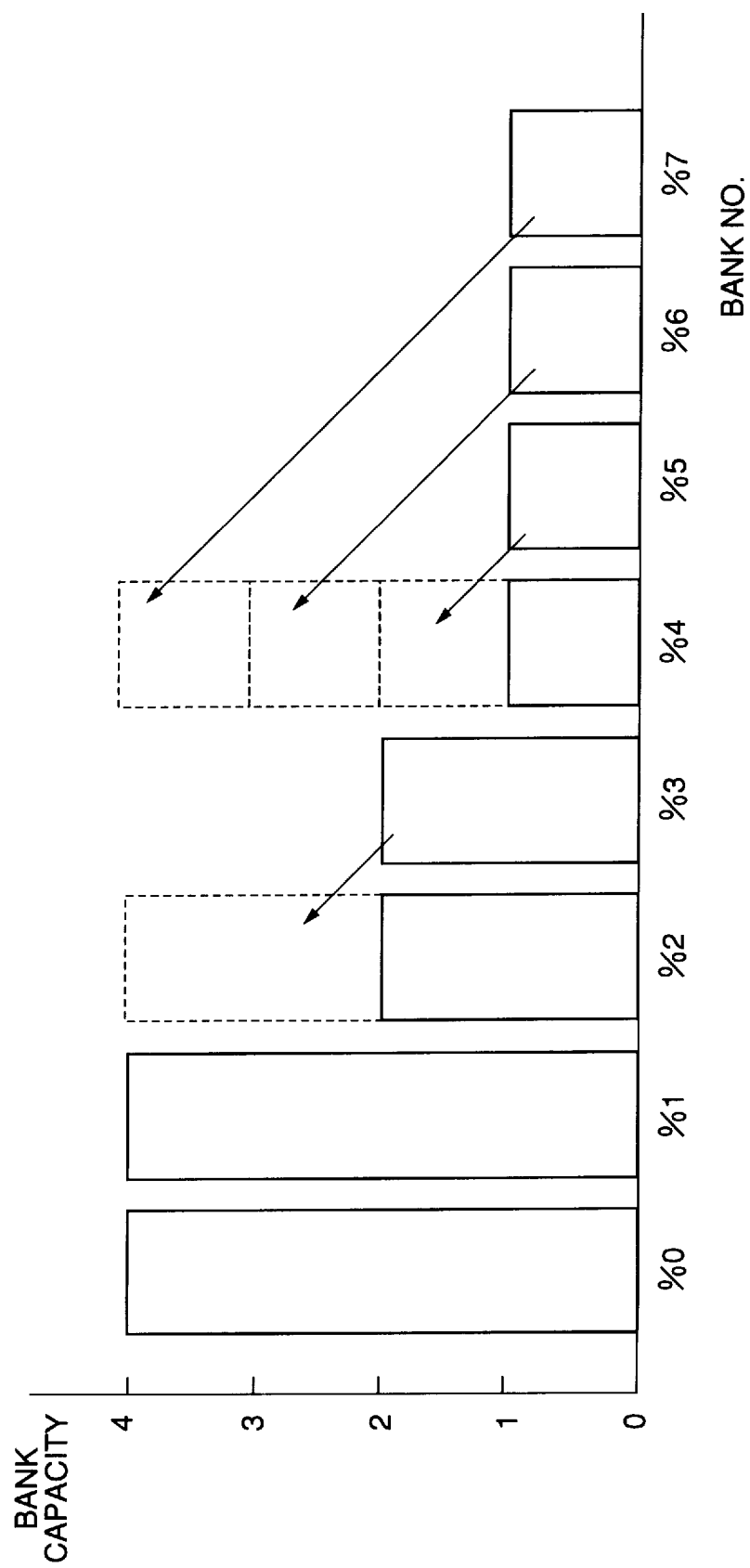
FIG. 8 is a diagram showing the other example of the interleave of the related art.

As explained above, the 5.5-way interleave can substantially be constituted as a result of the present invention. This multiplexing degree is higher than the multiplexing degree of 2.5 in FIG. 7 and the multiplexing degree of 4.0 in FIG. 8 of the related art.

In above example, it has been assumed that the banks are sequentially loaded without any space (or gap) from the smaller bank number to the larger bank number, and in the sequence of the large capacity. But, this loading indicates only the logical point of view, and it is not a physical limitation on the bank (slot). Therefore, such limitation can be eliminated by providing a table that can convert logical bank numbers into physical bank numbers.

Next, a preferred embodiment of the memory control apparatus of the present invention will be explained in detail with reference to the accompanying drawings.

Figure 1:
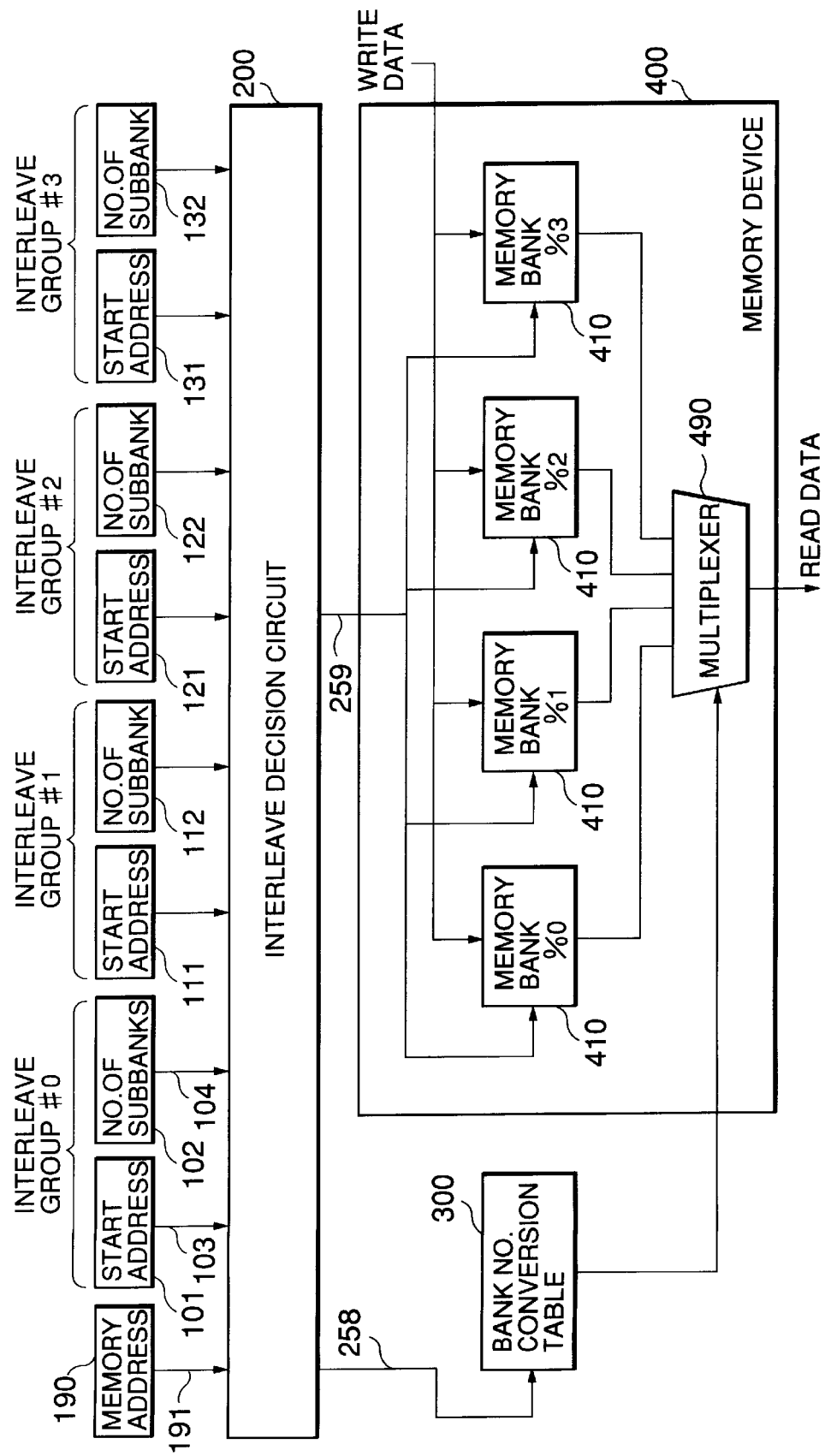
FIG. 1 is a block diagram showing a structure of the embodiment of the memory control apparatus of the present invention.

Referring to FIG. 1, an embodiment of the memory control apparatus of the present invention is assumed to have four interleave groups. The memory control apparatus includes starting address registers 101, 111, 121, 131 for holding the start addresses for each respective interleave group, and sub-bank number registers 102, 112, 122, 132 for holding the sub-bank numbers for each respective interleave group. These starting addresses and sub-bank numbers are input to an interleave decision circuit 200. Moreover, a memory address 191 to be accessed is input to the interleave decision circuit 200 from a memory address register 190.

The interleave decision circuit 200 outputs a bank number 258 and an address in the bank 259, based on the above input.

A bank number conversion table 300 converts a logical bank number 258 output from the interleave deciding circuit 200 into a physical bank number.

A memory apparatus 400 has four memory banks 410. When the memory access is based on a read request, a multiplexer 490 selects one output of the memory banks 410 as the read data, depending on the physical bank number received from the bank number conversion table 300.

In the example given in FIG. 1, the interleave group number and memory bank number are set to four, but this value is determined only for the convenience of explanation, and this value can be set freely depending on the requirements of the system.

Next, operation of the embodiment of the memory control apparatus of the present invention will be explained with reference to the accompanying drawings. Referring to FIG. 1, when an effective address is set to the memory address register 190, its output 191 is sent to the interleave decision circuit 200. The start address and number of sub-banks of each interleave group are given as the parameters to the interleave decision circuit 200. In the embodiment of the memory control apparatus of the present invention, in order to simplify the explanation of the embodiment, all of the sub-banks are assumed to be of the same type and have the same size or capacity, and thus when the number of sub-banks is determined, the memory capacity of the relevant group is also determined. For the assignment of the start address, like an example in the eight banks of FIG. 5, the start address of the interleave group #0 is assumed to be set to "0" and it is assigned without any gap and overlap of address in the sequence of the interleave groups #1, #2 and #3. Setting is done by software or hardware at the time when the apparatus is constructed or when the structure of the apparatus is changed. Upon reception of the memory address under the condition of access request, the interleave decision circuit 200 decides the group number by comparing the memory address with the address range assigned to each interleave group, and outputs the bank number to be activated and the address in the bank by computing the sub-bank in the interleave group.

The bank number decided by the interleave decision circuit 200 is a logical bank number, and it is converted to a physical bank number corresponding to the loading position. The bank number conversion table 300 converts the logical bank number 258 to the physical bank number. The memory apparatus 400 then makes access to the memory bank 410 corresponding to the physical bank number.

In this embodiment, the selected physical bank number is used only as a selection signal for selecting the read data of the banks, but can also be used in the wider range to provide various control signals for the bank, such as an address strobe signal, and as an input signal to the logic corresponding to each memory bank for bank busy management.

Meanwhile, the bank address 259 output from the interleave decision circuit 200 is determined, in the selected bank, on the basis of the sub-bank number occupied by the interleave group and offset address in the sub-bank.

Figure 2:
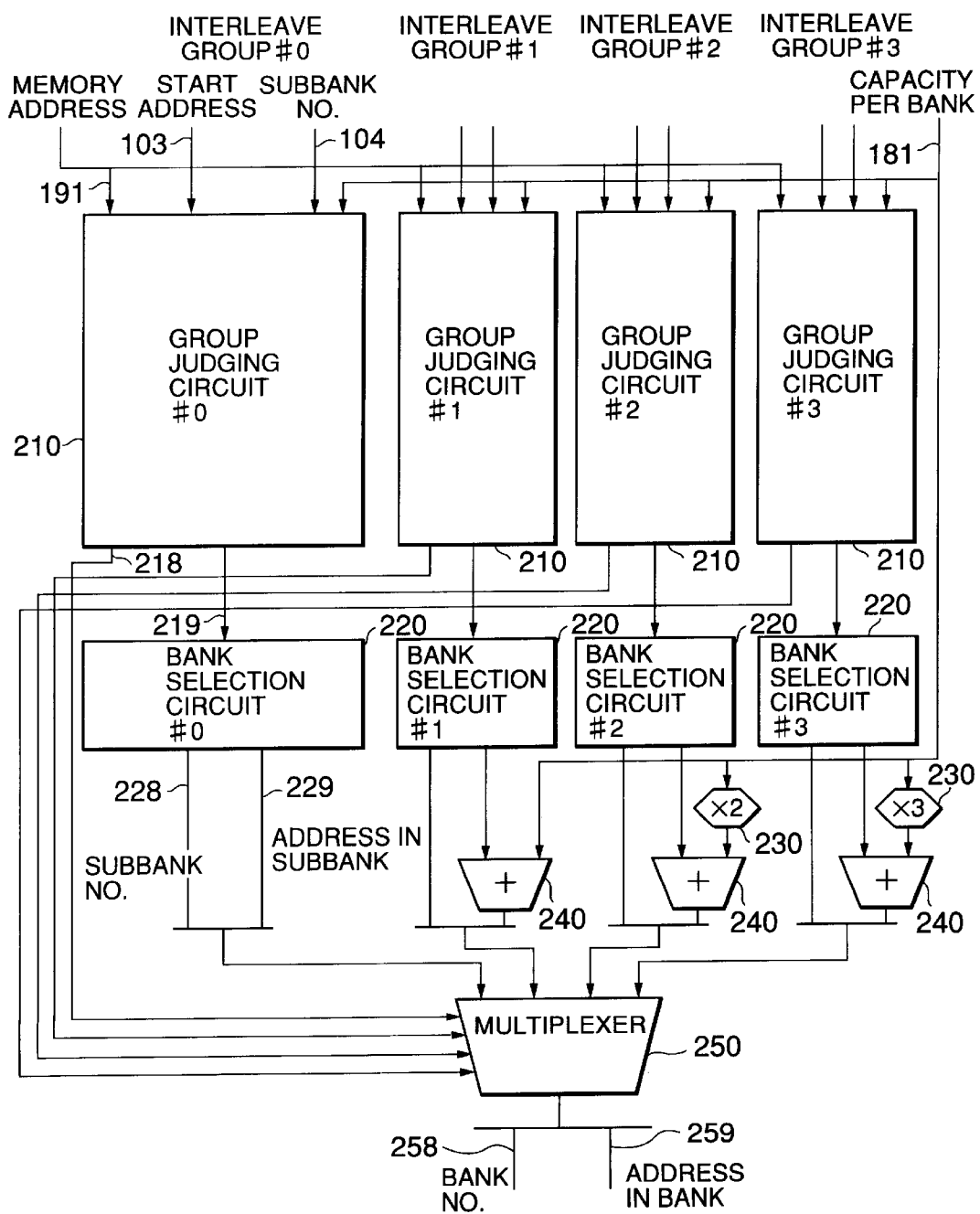
FIG. 2 is a diagram showing a structure of an interleave deciding circuit in the embodiment of the present invention.

Referring to FIG. 2, the interleave decision circuit 200 includes a plurality of pairs, where each pair corresponds to a group judging circuit 210 and a bank selection circuit 220, with the number of pairs corresponding to the number of interleave groups. In this embodiment, the number of interleave groups is set to four, but this number can naturally be set freely to any other integer value depending on the requirements of the system. Moreover, in the actual design stage, a certain part or circuit may be shared in the circuits for the different interleave groups, but the invention will be explained with reference to separate components used for each interleave group, in order to provide a clearer explanation of the present invention.

Figure 3:
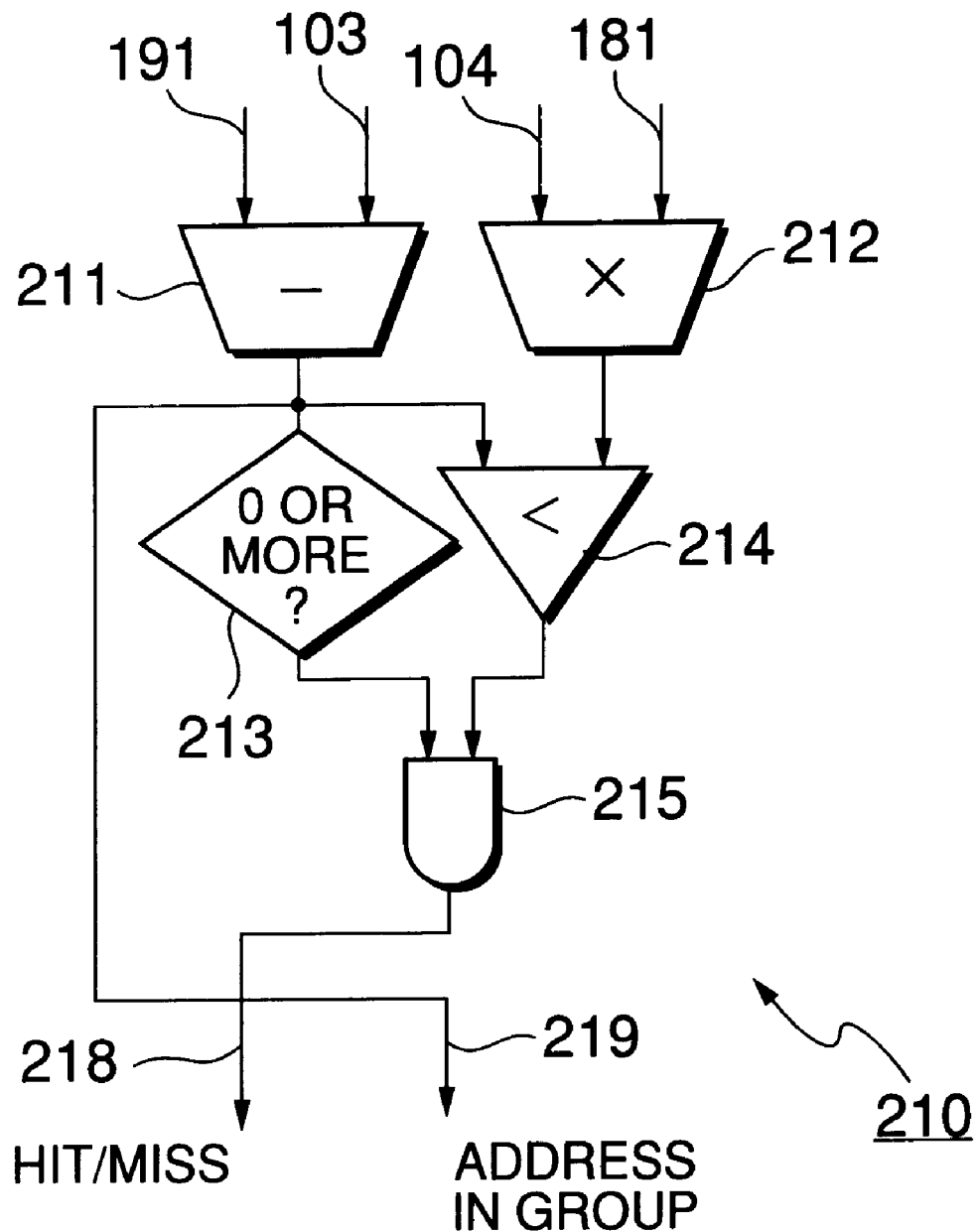
FIG. 3 is a diagram showing a structure of a group judging circuit in the embodiment of the present invention.

Referring to FIG. 3, when the memory address 191 is input, each group judging circuit 210 judges to which address range of the interleave group such address falls. For this purpose, the start address 103 of the group is subtracted from the memory address 191 requested by the subtractor 211. This subtraction result is judged by the zero judging circuit 213. If the result is negative, it is determined that the input memory address is smaller than the start address and is located outside of the range of the interleave group. On the other hand, when the subtraction result is positive or zero, the upper limit test is executed because at least the memory address 191 is larger than the lower limit of the address range of the interleave group and thus may be within the range of the interleave group.

Since the subtraction result output from subtractor 211 corresponds to the offset address in the interleave group, in the upper limit test, the subtraction result can be compared with the upper limit to determine whether the memory address is within the range of the interleave group. Capacity of the interleave group is given as a product of the number of the sub-banks 104, and the capacity 182 of each sub-bank in the interleave group. Therefore, if the offset address is smaller than the group capacity when an output of the multiplier 212 is compared with the offset address (subtraction result) of the interleave group in the comparator 214, it is determined that the input memory address exists in the relevant group. When the memory address exists in the interleave group, it is called a "hitting" condition, and when the memory address does not exist in the interleave group, it is called a "missing" condition. Namely, the result 218 obtained when a logical product of an output of the zero judging circuit 213 and an output of the comparator 214 is generated in the logical product gate 215 indicates the "hitting" condition or "missing" condition. Moreover, an output of the subtractor 211 is output as the address 219 in the group. The capacity 181 of one sub-bank may be provided externally to the interleave decision circuit 200, or may be held in a register provided within the interleave decision circuit 200.

Figure 4:
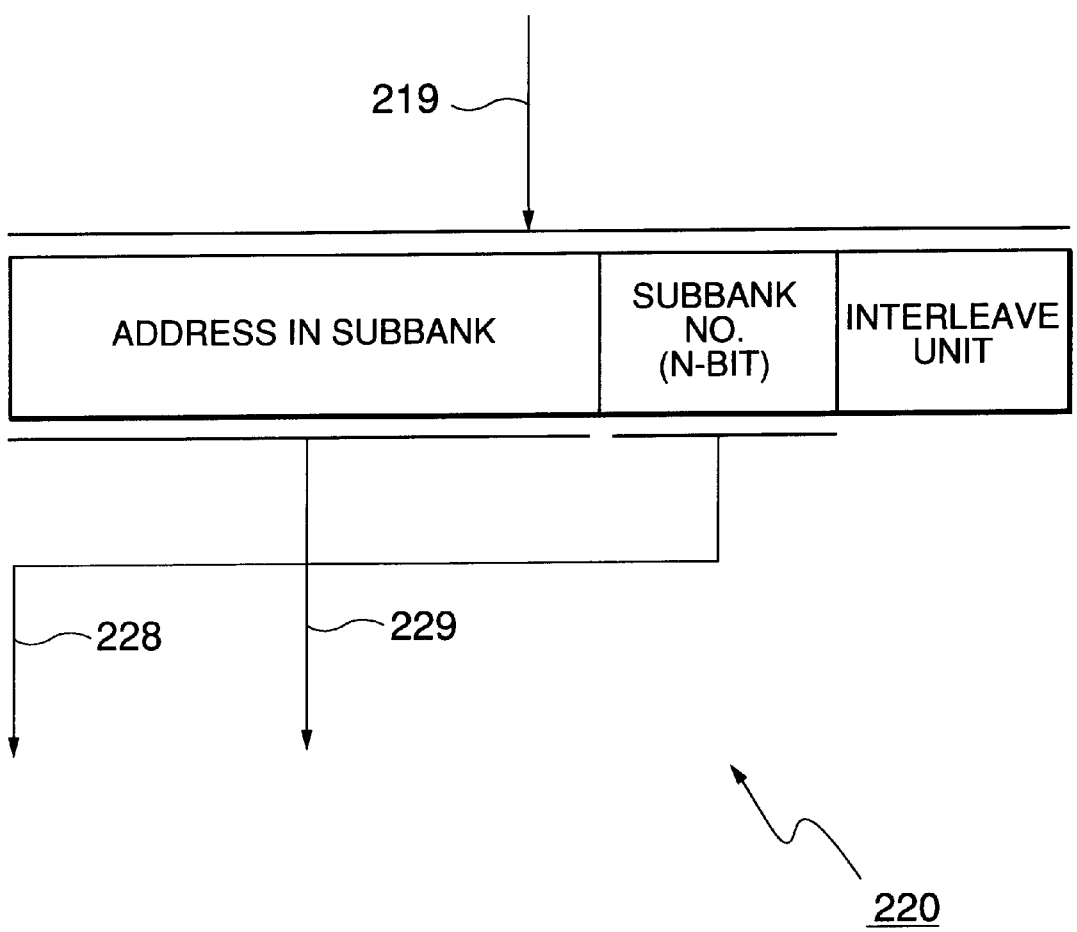
FIG. 4 is a diagram showing a structure of a bank selection circuit in the embodiment of the present invention.

When the corresponding interleave group number is detected, the bank selection circuit 220 decides to what address of which sub-bank in the interleave group the access should be made. Referring to FIG. 4, the bank selection circuit 220 outputs a part of the address 219 to be used for interleave as the bank number 228, and another part of the address 219 as the address 229 in the sub-bank. The bank selection circuit 220 does not output a remaining part of the address that corresponds to the unit of interleave. In more practical terms, for example, when it is assumed that when interleave is executed in every four bytes in a memory address space of 32 bits with the multiplexing degree of interleave of 8-way, the lower two bits are ignored, the upper three bits become the bank number 228, and the remaining 27 bits become the address 229 in the sub-bank.

However, in the present embodiment, since the sub-bank capacity is assumed to be 1 MB, the upper nine bits in the 27 bits are set to "0", and only the lower 18 bits are substantially used as the address in the sub-bank. Namely, in the case of executing the interleave of which multiplexing degree is given by the integral power of two, the N bits are used as the bank number 228.

Referring to FIG. 2, an output of the bank selection circuit 220 is input to the multiplexer 250 as the bank number and address in the bank, and these are used to select the appropriate bank and address within the bank via signals 258 and 259. Here, if it is assumed that each logical bank is assigned in the sequence of larger capacity, the sub-bank number matches with the logical bank number. On the other hand, the address in the bank matches with the address in the sub-bank in the interleave group #0, but these are not matched in the other interleave groups. In order to convert the address in the sub-bank into the address in the bank, a constant address (or offset) must be added depending on the interleave group number. Namely, in the case of the interleave group #1, the value obtained by adding one sub-bank capacity to the address in the sub-bank is used as the address in the bank. In the case of the interleave group #2, the value obtained by adding two sub-bank capacities to the address in the sub-bank is used as the address in the bank, while in the case of the interleave group #3, the value obtained by adding three sub-bank capacities is used as the address in the bank, respectively. This computation is carried out in the multiplier 230 and adder 240.

According to the embodiment of the present invention, as explained above, each bank is divided into sub-banks and these sub-banks are combined to form an interleave group. Therefore, the interleave having an effectively higher multiplexing degree can be realized by executing the interleave in the interleave group. In view of the addressing corresponding to such interleave group, the group judging circuit 210 generates the corresponding interleave is group and the address in such group, while the bank selection circuit 220 generates the sub-bank number and address in the sub-bank and the multiplier 230 and adder 240 generate the address in the bank.

As will be apparent from the above explanation, according to the present invention, an interleave having a higher multiplexing degree may be realized depending on the loading condition between memory banks having a plurality of different capacities, without any limitation on the loading and sufficient memory performance can be obtained, while keeping the degree of freedom of the memory structure.

While a preferred embodiment has been described herein, modification of the described embodiment may become apparent to those of ordinary skill in the art, following the teachings of the invention, without departing from the scope of the invention as set forth in the appended claims. While the present invention has been described with respect to DRAM, the present invention is applied to other memory chips (e.g., SDRAM).

While the present invention has been described with reference to interleave groups having sub-banks of equal size or capacity, one of ordinary skill in the art will recognize that an interleave group or groups may be formed having sub-banks of different size than other interleave groups in the same memory. For example, referring to FIG. 5, the sub-banks in interleave groups 2 and 3 can be combined to form a single interleave group 2', where interleave group 2' has a sub-bank capacity of 2×1 MB=2 MB, and while interleave groups 0 and 1 have sub-bank capacities of 1 MB.

What is claimed is:

1. A memory control apparatus for a memory apparatus having a plurality of memory banks, comprising:

an interleave group forming unit that forms interleave groups by dividing each of said plurality of memory banks to sub-banks, and then combining sub-banks belonging to different memory banks;

an interleave deciding unit that generates addresses in the banks of a plurality of said memory banks to form an interleave in each of said interleave groups on the basis of said memory apparatus as a whole;

a plurality of start address registers for said plurality of interleave groups, respectively, said start address registers holding a start address for said corresponding interleave group; and a plurality of sub-bank number registers for said plurality of interleave groups, respectively, said sub-bank number registers holding a number of sub-banks belonging to said corresponding interleave group, wherein said interleave group deciding circuit includes a group judging circuit, said group judging circuit includes, a subtractor for subtracting said start address from an address of said memory apparatus as a whole and outputting a result of subtraction as the address in the relevant interleave group;

a multiplier for multiplying a sub-bank capacity to said number of sub-banks; and means for determining that an output of said subtractor is within a range of the relevant interleave group when the output of said subtractor is equal to or higher than a first value and is smaller than the output of said multiplier, and for determining that the output of said subtractor is not within the range of the relevant interleave group when the output of said subtractor is either less than the first value or greater than or equal to the output of said multiplier.

2. A memory control apparatus according to claim 1, wherein said interleave deciding circuit comprises:

a bank selection circuit for outputting said sub-bank number and address in a sub-bank corresponding to said sub-bank number on the basis of the address in said interleave group.

3. A memory control apparatus according to claim 2, wherein said interleave group deciding circuit comprises:

means for generating an address in said bank on the basis of the address in said sub-bank.

4. A memory control apparatus for a memory apparatus having a plurality of memory banks, comprising:

an interleave group forming unit that forms interleave groups by dividing each of said plurality of memory banks to sub-banks, and then combining subbanks belonging to different memory banks;

an interleave deciding unit that generates addresses in the banks of a plurality of said memory banks to form an interleave in each of said interleave groups on the basis of said memory apparatus as a whole;

a plurality of start address registers for said plurality of interleave groups, respectively, said start address registers holding a start address for said corresponding interleave group; and a plurality of sub-bank number registers for said plurality of interleave groups, respectively, said sub-bank number registers holding a number of sub-banks belonging to said corresponding interleave group, wherein said interleave group deciding circuit includes a group judging circuit, said group judging circuit includes, a subtractor for subtracting said start address from an address of said memory apparatus as a whole and outputting a result of subtraction as the address in the relevant interleave group;

a multiplier for multiplying a sub-bank capacity to said number of sub-banks; and a determining unit that determines that an output of said subtractor is within a range of the relevant interleave group when the output of said subtractor is equal to or higher than a first value and is smaller than the output of said multiplier, and for determining that the output of said subtractor is not within the range of the relevant interleave group when the output of said subtractor is either less than the first value or greater than or equal to the output of said multiplier.

* * * * *